United States Patent [19]

Kato

[11] Patent Number: 4,984,959
[45] Date of Patent: Jan. 15, 1991

[54] INDUSTRIAL ROBOT

[75] Inventor: Hisao Kato, Inazawa, Japan

[73] Assignee: Mitsubishi Denki Kabushiki Kaisha, Inazawa, Japan

[21] Appl. No.: 379,030

[22] Filed: Jul. 12, 1989

[30] Foreign Application Priority Data

Jul. 13, 1988 [JP] Japan .................. 63-174213

[51] Int. Cl.$^5$ ............................... B25J 18/00
[52] U.S. Cl. ..................... 414/744.3; 414/744.5; 901/26; 901/19; 74/479
[58] Field of Search .......... 901/15, 17, 19, 23, 901/25, 26, 27, 28; 414/732, 744.3, 744.4, 744.5; 74/479

[56] References Cited

U.S. PATENT DOCUMENTS

| | | | |
|---|---|---|---|
| 3,922,930 | 12/1975 | Fletcher et al. | 901/27 X |
| 4,030,617 | 6/1977 | Richter | 901/23 X |
| 4,738,015 | 4/1988 | Kato | 901/15 X |
| 4,767,257 | 8/1988 | Kato | 901/15 X |
| 4,782,713 | 11/1988 | Torii et al. | 901/27 X |
| 4,787,813 | 11/1988 | Stevens et al. | 901/23 X |
| 4,829,840 | 5/1989 | Torii et al. | 901/15 X |
| 4,854,808 | 8/1989 | Bruno | 901/26 X |

FOREIGN PATENT DOCUMENTS 2717870 10/1978 Fed. Rep. of Germany ... 901/19 X

Primary Examiner—Robert J. Spar
Assistant Examiner—James T. Eller, Jr.
Attorney, Agent, or Firm—Sughrue, Mion, Zinn, Macpeak & Seas

[57] ABSTRACT

An industrial robot has respective actuators mounted within the main body for moving the upper arm, the forearm, and the wrist via respective gear trains, thereby providing light-weight joint sections and eliminating the need for external cables swinging along with the arms. The upper arm, forearm, elbow, and wrist units are made in modular form for easy replacement and substitution of different length arm units.

15 Claims, 5 Drawing Sheets

INDUSTRIAL ROBOT

BACKGROUND OF THE INVENTION

This invention relates generally to industrial robots with horizontally movable arms and, particularly, to an industrial robot having a horizontal arm which is movable quickly and reliably.

A conventional industrial robot similar to what is disclosed in Japanese Patent Application Kokai No. 58-211,889 is shown in FIG. 1. This industrial robot includes a body 1, an elevation trunk 2, a horizontal upper arm 3, one end of which is operably connected to the upper end of the elevation trunk 2, a shoulder 4 provided on the top of the elevation trunk 2 and composed of an electric motor and a speed reducer to swing the upper arm 3 in a horizontal plane, a horizontal forearm 5 operably connected to the other end of the upper arm 3, and an elbow 6 provided on the other end of the upper arm 3 and composed of an electric motor and a speed reducer to swing the forearm 5.

Further, it includes a hand 7 operably connected to the other end of the forearm 5, a wrist 8 provided at the other end of the forearm 5 and composed of an electric motor and a speed reducer to rotate the hand 7, a first cable 9 extending from the body 1 to the shoulder 4, a second cable 10 extending from the body to the elbow 6, a third cable 11 extending from the body 1 to the wrist 8, and a cable holder 12 for holding the middle portions of the second and third cables 10 and 11.

The hand 7 of the above conventional robot is brought into a desired position as follows. The elevation trunk 2 is moved vertically to position the upper arm 3 at a desired height. The shoulder 4 is then energized via the first cable 9 to swing the upper arm 3 to a desired position. The elbow 6 is then energized via the second cable 10 to swing the forearm 5 to a desired position. The wrist 8 is then energized via the third cable 11 to rotate the hand 7 to a desired position. After the hand 7 has performed a desired operation, the respective shoulder 4, elbow 6, and wrist 8 are energized for the next operation.

However, the above conventional robot has the heavy shoulder 4, elbow 6, and wrist 8 on the respective ends of horizontal arms 3, 5 and the heavy cables 9-11 for energizing these joint devices. Consequently, these joint devices must have large outputs in order to operate these arms with high acceleration or deceleration at high speed. The large weight of these joint devices makes it difficult to move the arms quickly. In addition, the cables 9-11, placed along the outside of arms, are liable to breakdown, resulting in malfunction of the robot. Moreover, since the upper arm 3 and forearm 5 are made integrally, it is difficult to meet particular requirements, such as mounting horizontal arms of different lengths or a hand in different directions.

SUMMARY OF THE INVENTION

Accordingly, it is an object of the invention to provide an industrial robot capable of moving its arms quickly.

It is another object of the invention to provide an industrial robot having no or few problems resulting from the breakdown of cables which have been placed along the outside of the robot arms.

It is still another object of the invention to provide an industrial robot which is highly adaptable to providing different lengths of horizontal arms.

In accordance with one aspect of the invention, respective actuators for the shoulder, elbow, and wrist are provided within the body of an industrial robot, and the power of these actuators is transmitted to the joint devices via respective transmission mechanisms.

In accordance with another aspect of the invention, the horizontal arms are made up of modular arm and joint units.

According to the invention, no actuators are provided on the horizontal arms so that the weight of a working section becomes very small. With the actuators provided within the body, it is possible to put the cables on the fixed part of the robot, thereby eliminating the possibility that the cables are swung along with the arms. The modular arm units makes it easy to select an arm of a given length.

DESCRIPTION OF THE PREFERRED EMBODIMENT

Figure 1:
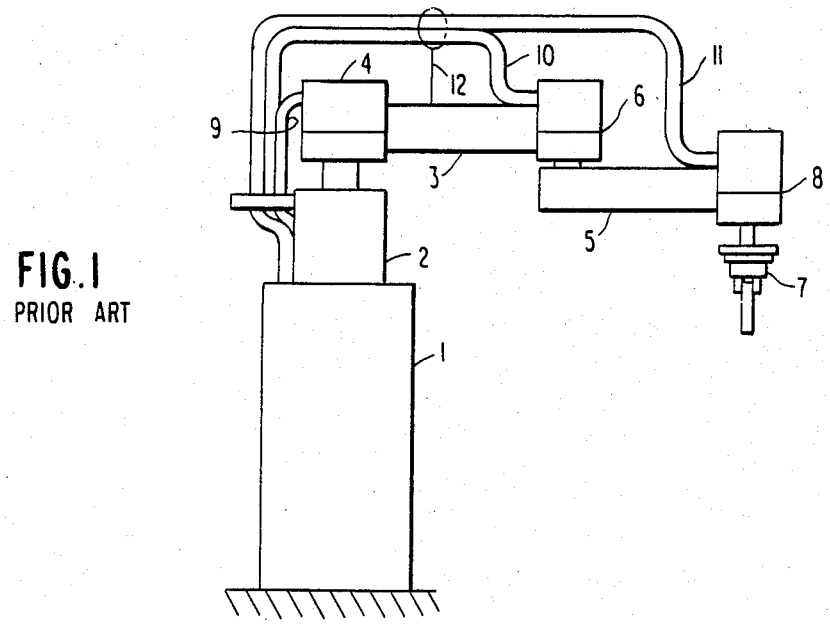
FIG. 1 is a side view of a conventional industrial robot.

Reference is made to FIGS. 2-12 to describe an industrial robot according to an embodiment of the invention, wherein like reference numerals denote like or corresponding parts.

Figure 2:
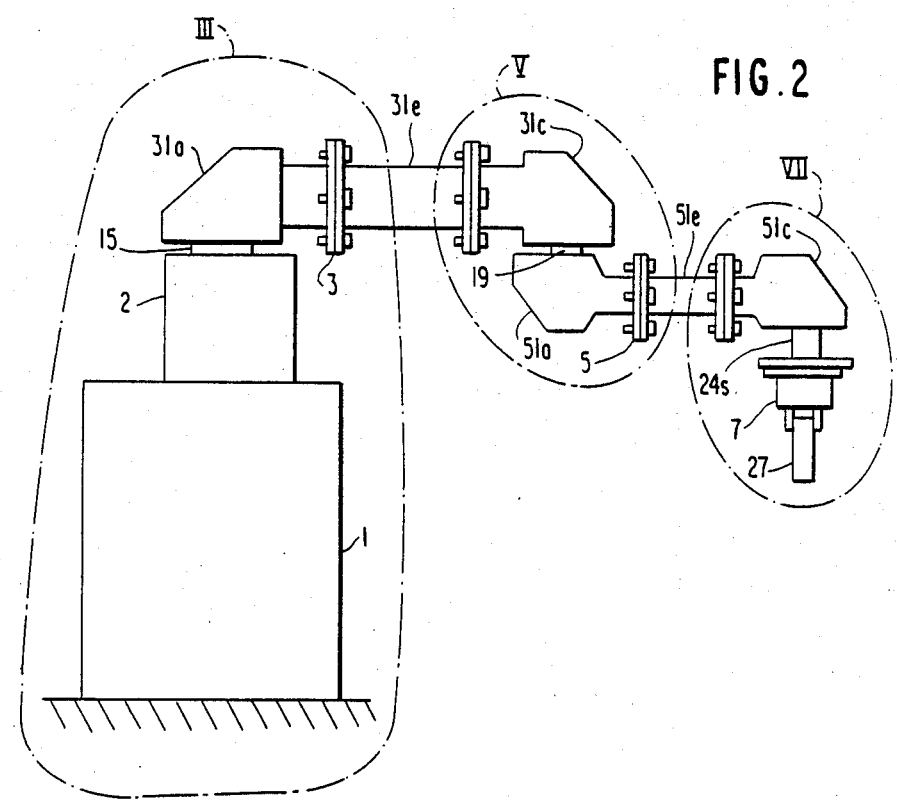
FIG. 2 is a side view of an industrial robot according to an embodiment of the invention.

In FIG. 2, the industrial robot includes a body 1, a trunk 2 movably supported by the body 1, a substantially L-shaped shoulder unit 31a with a first cylindrical shoulder shaft 15 rotatably supported by the trunk 2, a straight upper arm unit 31e connected to the shoulder unit 31a at one end, an elbow unit consisting of an upper elbow unit 31c which is connected to the upper arm unit 31e and a substantially L-shaped lower elbow unit 51a with a cylindrical elbow shaft 19 which is rotatably supported by the upper elbow unit 31c, a straight forearm unit 51e connected to the lower elbow unit 51a at one end, a substantially L-shaped wrist unit 51c connected to the forearm unit 51e, and a hand device 7 attached to a wrist shaft 24s of the wrist unit 51c.

Figure 3:
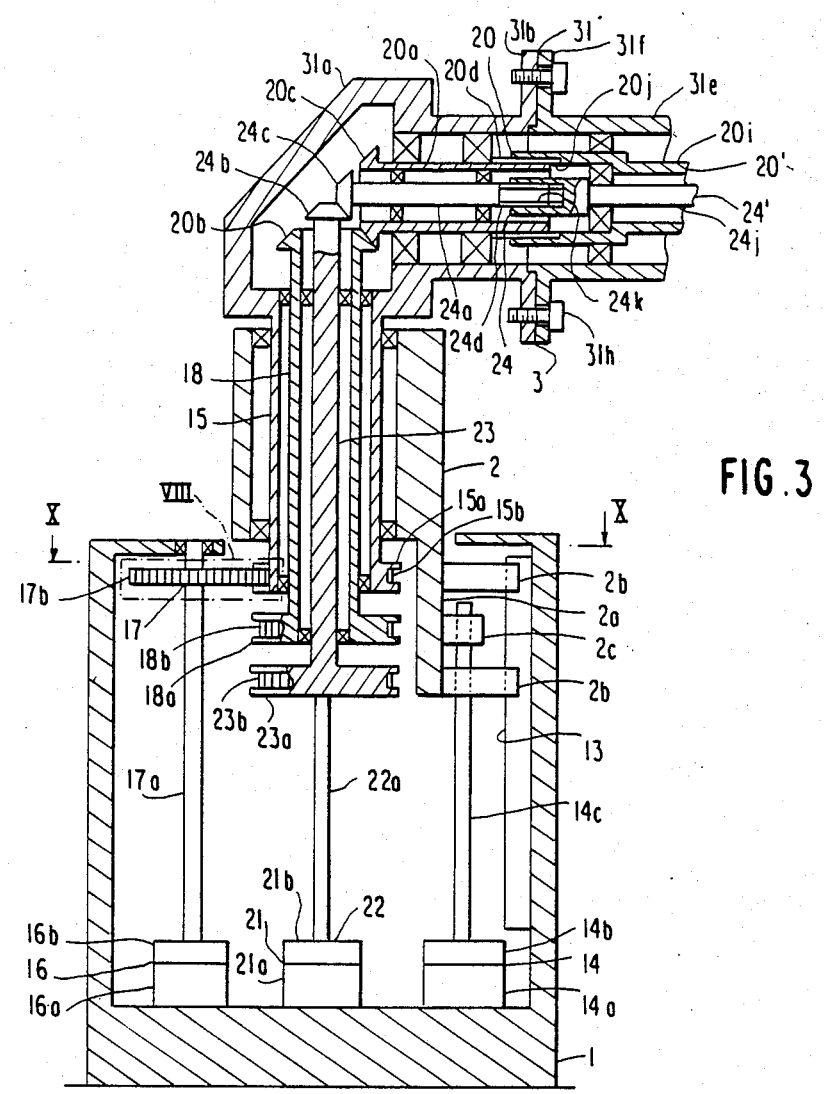
FIG. 3 is a longitudinal section of the shoulder portion III of FIG. 2.
Figure 10:
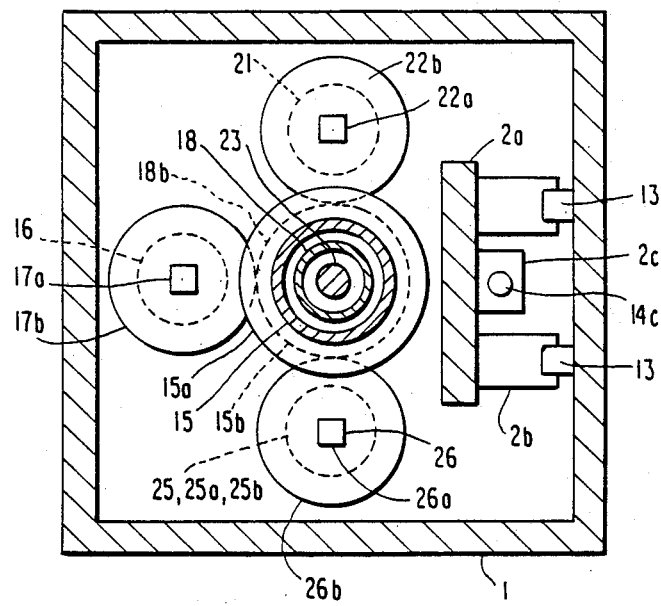
FIG. 10 is a sectional view taken along the line X—X of FIG. 3.

In FIG. 3, part of the lower end of the trunk 2 extends downwardly to form a flat member 2a, to which two pairs of guide members 2b are secured (FIG. 10). Also secured to the flat member 2a is a nut 2c which engages a pole screw to be described below. The body 1 has on the inside wall a pair of vertical rails 13 along which the guide members 2b slide. Mounted on the bottom of the body 1 is a trunk actuator 14 which is composed of an electric motor 14a and a speed reducer 14b to rotate the pole screw 14c which engages the nut 2c.

Figure 8:
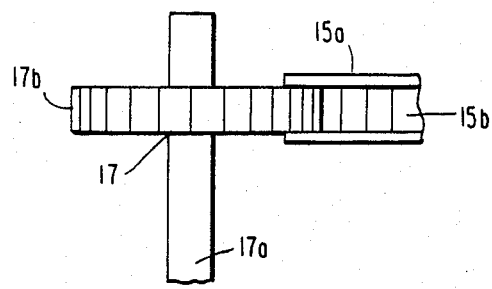
FIG. 8 is a side view of the shoulder transmission VIII of FIG. 3.
Figure 9:
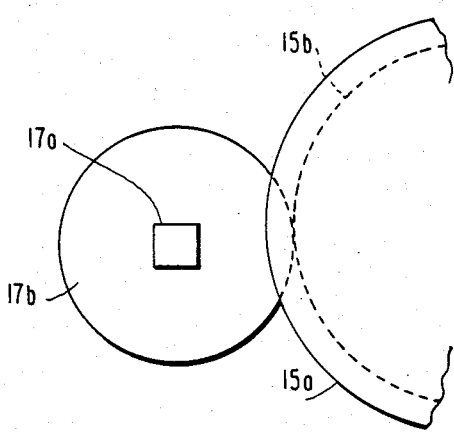
FIG. 9 is a plan view of the shoulder transmission VIII of FIG. 3.

A first cylindrical shoulder shaft 15 is rotatably supported by the trunk 2. The upper end of the shoulder shaft 15 is secured to a body of the shoulder unit 31a which is connected to an upper arm unit 31e to be described below, and the lower end thereof is provided with a toothed wheel 15b with a pair of flanges 15a (FIGS. 8 and 9). A shoulder actuator 16 is mounted on the bottom of the body 1 and composed of an electric motor 16a and a speed reducer 16b drive a shoulder transmission 17 which is composed of a spline shaft 17a made of a rectangular rod and a driving gear wheel 17b which engages the toothed wheel 15b between the flanges 15a and slides along the spline shaft 17a. A second cylindrical shoulder shaft 18 is rotatably supported by the first cylindrical shoulder shaft 15, to the lower end of which a toothed wheel 18b with a pair of flanges 18a is secured.

Figure 4:
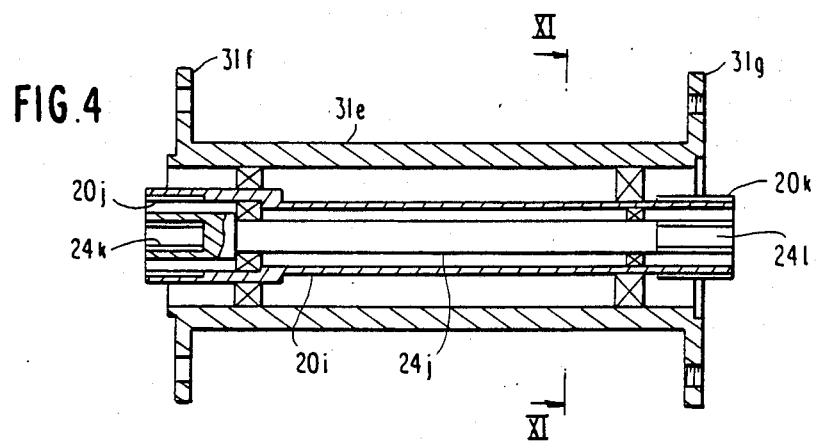
FIG. 4 is a longitudinal section of the modular upper arm unit of FIG. 2.
Figure 11:
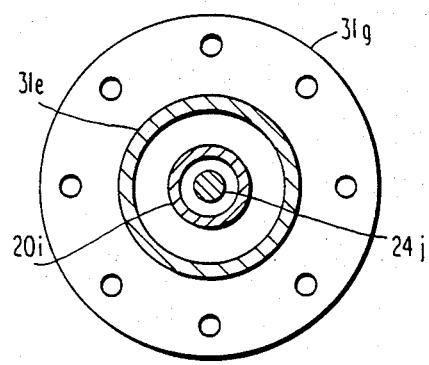
FIG. 11 is a sectional view taken along the line XI—XI of FIG. 4.

As shown in FIG. 2, a horizontal upper arm 3 is made in the form of an arm assembly 31 which is composed of part of the shoulder unit 31a with the first cylindrical shoulder shaft 15 at one end and a flange 31b at the other end (FIG. 3), part of upper elbow section 31c having a flange 31d (FIG. 5), and an upper arm unit 31e having a pair of flanges 31f and 31g at either end (FIGS. 4 and 11). The length of the arm assembly 31 may be adjusted by changing the length of the upper arm unit 31e. The opposed flanges 31b, 31f and 31d, 31g are joined together with bolts 31h.

The shoulder actuator 16 rotates the upper arm (i.e., rotates the shoulder and everything else) via spline shaft 17a, gear wheel 17b, toothed gear 15b, cylindrical shaft 15 and shoulder 31a.

Figure 5:
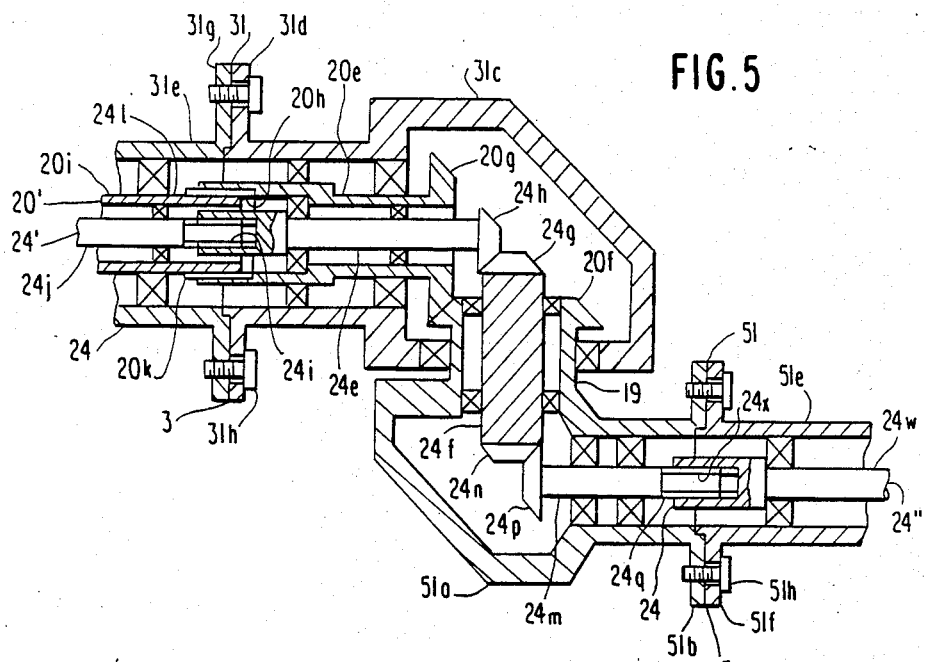
FIG. 5 is a longitudinal section of the elbow portion V of FIG. 2.
Figure 6:
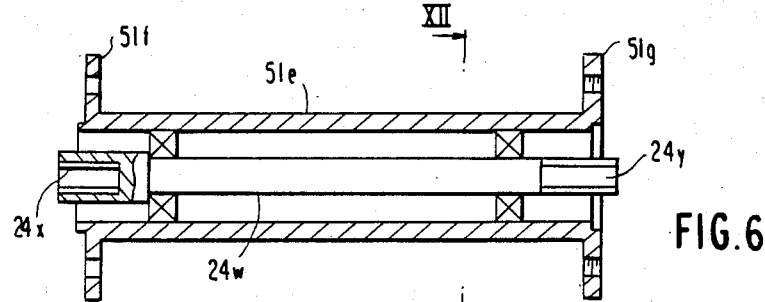
FIG. 6 is a longitudinal section of the modular forearm unit of FIG. 2.
Figure 12:
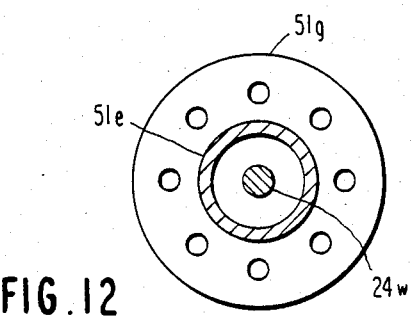
FIG. 12 is a sectional view taken along the line XII—XII of FIG. 6.

A horizontal forearm 5 is made in the form of an arm assembly 51 which is composed of part of a lower elbow section 51a rotatably connected to the upper elbow section 31c and having a flange 51b at the other end (FIG. 5), part of the wrist unit 51c having a flange 51d (FIG. 7), and a forearm unit 51e having a pair of flanges 51f, 51g at either end (FIGS. 6 and 12). The opposed flanges 51b, 51f and 51d, 51g are joined together with bolts 51h. A cylindrical elbow shaft 19 is secured to the lower elbow section 51a at the lower end and rotatably supported by the upper elbow section 31c (FIG. 5).

As shown in FIG. 3, a forearm transmission 20 provided within the horizontal upper arm 3 includes a horizontal cylindrical shoulder shaft 20a which is rotatably supported by the shoulder unit 31a and has at one end a bevel gear wheel 20c engaged with a bevel gear wheel 20b secured to the second cylindrical shoulder shaft 18 and at the other end a spline shaft 20d. As shown in FIG. 5, a horizontal cylindrical upper elbow shaft 20e is rotatably supported by the upper elbow section 31c and has at one end a bevel gear wheel 20g engaged with the bevel gear wheel 20f of the lower elbow cylindrical shaft 19 and at the other end a spline groove 20h. As shown in FIGS. 3-5, a cylindrical upper arm shaft 20i is rotatably supported by the cylindrical upper arm unit 31e and has at one end a spline groove 20j fitting over the spline shaft 20d and at the other end a spline shaft 20k fitting in the spline groove 20h of the horizontal cylindrical upper elbow shaft 20e. The horizontal cylindrical shoulder shaft 20a, the horizontal cylindrical upper elbow shaft 20e, and the cylindrical upper arm shaft 20i constitute a horizontal cylindrical upper arm shaft 20'.

An elbow actuator 21 is mounted on the bottom of the body 1 and composed of an electric motor 21a and a speed reducer 21b. An elbow transmission shaft 22 is composed of a rectangular spline bar 22a which is driven by the elbow actuator 21 and a driving gear wheel 22b (FIG. 10) which engages the toothed wheel 18b between flanges 18a and slides along the spline bar 22a. The elbow actuator 21 transmits rotational motion to gear wheel 22b, which causes the forearm to rotate at the elbow via toothed wheel 18b, cylindrical shaft 18, bevel gears 20b and 20c, cylindrical shaft 20a, spline shaft 20d, spline groove 20j, cylindrical shaft 20i, spline shaft 20k, spline groove 20h, cylindrical shaft 20e, bevel gears 20g and 20f, and lower shoulder portion 51a.

A solid shoulder shaft 23 rotatably supported by the second cylindrical shoulder shaft 18 has a toothed wheel 23b with a pair of flanges 23a at the lower end.

A hand transmission 24 is mounted through the upper arm 3 and the forearm 5. A horizontal solid shoulder shaft 24a is rotatably supported by the horizontal cylindrical shoulder shaft 20a and has a bevel gear wheel 24c engaged with a bevel gear wheel 24b of the solid shoulder shaft 23 and a spline shaft 24d at the other end. A horizontal solid upper elbow shaft 24e is rotatably supported by the horizontal cylindrical upper elbow shaft 20e and has a bevel gear wheel 24h engaged with the bevel gear wheel 24g of a solid lower elbow shaft 24f and a spline groove 24i at the other end. A horizontal solid upper arm shaft 24j is rotatably supported by the horizontal cylindrical upper arm shaft 20i and has a spline groove 24k fitting over the spline shaft 24d and a spline shaft 24l fitting in the spline groove 24i. The horizontal solid shoulder shaft 24a, the horizontal solid upper elbow shaft 24e, and the solid upper arm shaft 24j constitute a horizontal solid upper arm shaft 24'.

Figure 7:
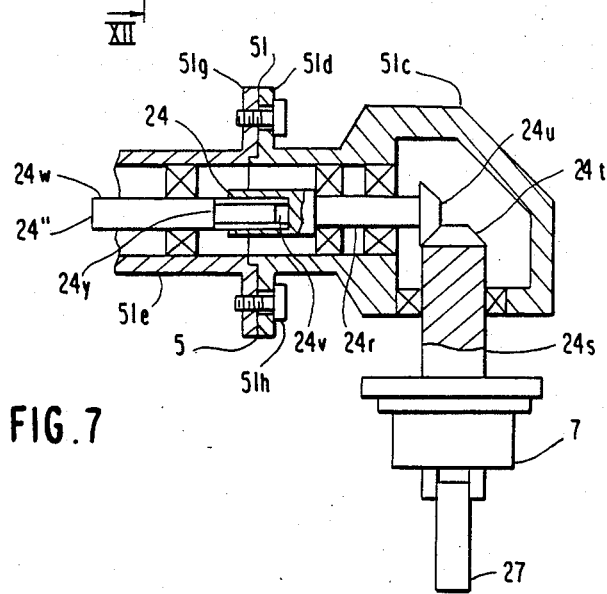
FIG. 7 is a longitudinal section of the wrist portion VII of FIG. 2.

As shown in FIG. 5, a horizontal lower elbow shaft 24m is rotatably supported by the lower elbow section 51a and has a bevel gear wheel 24p engaged with the bevel gear wheel 24m of the lower elbow shaft 24f and a spline shaft 24q at the other end. As shown in FIG. 7, a horizontal wrist shaft 24r is rotatably supported by the wrist unit 51c and has a bevel gear wheel 24u engaged with the bevel gear wheel 24t of a wrist shaft 24s and a spline groove 24v at the other end. A forearm shaft 24w is rotatably supported by the forearm unit 51e and has a spline groove 24x fitting over the spline shaft 24q and a spline shaft 24y fitting in the spline groove 24v of the horizontal wrist shaft 24r. The horizontal lower elbow shaft 24m, the horizontal wrist shaft 24r, and the forearm shaft 24w constitute a horizontal forearm shaft 24''.

As shown in FIG. 7, a hand device 7 is attached to the lower end of the wrist shaft 24s so as to grip workpiece 27.

As shown in FIG. 10, a wrist actuator 25 is mounted on the bottom of the body 1 and composed of an electric motor 25a and a speed reducer 25b. It will be appreciated that the components 25, 25a, 25b are arranged the same as 21, 21a, 21b of FIG. 3, but are not illustrated in FIG. 3. A wrist transmission 26 is composed of a rectangular spline shaft 26a driven by the wrist actuator 25 and a driving gear wheel 26b which engages the toothed wheel 23b between flanges 23a and slides along the spline shaft 26a.

In operation, the trunk actuator 14 is energized to move the trunk 2 upwardly or downwardly to bring the upper arm 3 to a desired height. The shoulder actuator 16 is then energized to rotate the first cylindrical shoulder shaft 15 via the shoulder transmission 17, bringing the upper arm 3 to a desired position in the horizontal plane. The elbow actuator 21 is then energized to rotate the cylindrical lower elbow shaft 19 via the elbow transmission 22 and the elbow gear train 20, bringing the forearm 5 to a desired position in the horizontal plane. The wrist actuator 25 is then energized to rotate the wrist shaft 24s via the wrist transmission 26 and the wrist gear train 24, bringing the hand device 7 to a desired angle in the horizontal plane. Thus, there is no need to mount a heavy actuator on each joint for swinging the arm, making the arm lighter. This lighter arm permits acceleration or deceleration at high speed, making the operation period shorter and thus the operation efficiency higher. In addition, the respective actuators are mounted on the fixed body so that no cables are swung along with the respective arms, thus minimizing breakdown of the cables and increasing the reliability of the robot.

The upper arm 3 is made in the form of an upper arm assembly 31 which is composed of the shoulder unit 31a, the upper arm unit 31e, and the upper elbow section 31c, and the forearm 5 is made in the form of a forearm assembly 51 which is composed of the lower elbow section 51a, the forearm unit 51e, and the wrist unit 51c. Each arm unit is joined together via flanges. The elbow gear train 20 is composed of the horizontal cylindrical shoulder shaft 20a of the shoulder unit 31a, the cylindrical upper arm shaft 20i of the upper arm unit 31e, and the horizontal cylindrical upper elbow shaft 20e of the elbow unit (31c, 51a), all the shafts being interconnected with spline joints. The hand gear train 24 is composed of the horizontal solid shoulder shaft 24a of the shoulder unit 31a, the solid upper arm shaft 24j of the upper arm unit 31e, the horizontal solid upper elbow shaft 24e, the solid lower elbow shaft 24f, and horizontal solid lower elbow shaft 24m of the elbow unit (31c, 51a), the forearm shaft 24w of the forearm unit 51e, the horizontal wrist shaft 24t, and the wrist shaft 24s of the wrist unit 51c. Thus, the upper arm 3 and the forearm 5 of any given length are easily made by selecting a modular upper arm unit 31e and forearm unit 51e of proper lengths.

Figure 13:
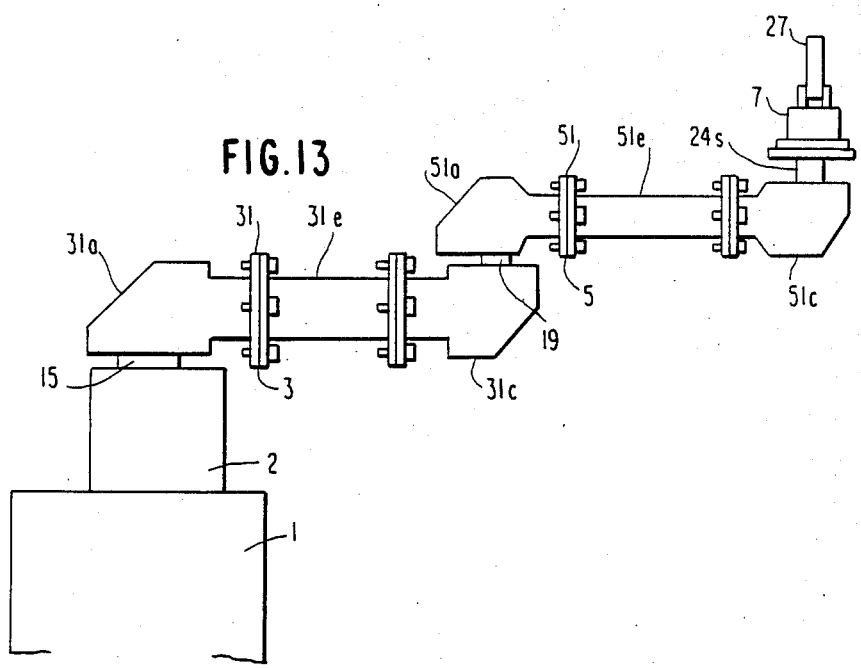
FIG. 13 is a side view of an industrial robot according to another embodiment of the invention.

Another embodiment of the invention is shown in FIG. 13, wherein like reference numerals denote like or corresponding parts of FIGS. 2-12. The only difference between FIGS. 2 and 13 is the orientation of mounting the upper and lower elbow portions 31c and 51a and the wrist portion 51c, resulting in an upward directed hand 27 in FIG. 13.

As has been described above, according to the invention, the hand device is brought into a desired position by moving the trunk with the trunk actuator within the body, the upper arm with shoulder actuator within the body via the shoulder transmission, and the forearm with the elbow actuator within the body via the elbow transmission and the elbow gear train, and its angle is controlled by the wrist actuator via the wrist transmission and the wrist gear train. The respective arms are driven by the actuators mounted within the body so that their weights are reduced, which increases the speed of operation of each arm. In this way, it is possible to provide an industrial robot with a short operation period.

Since all the actuators are mounted within the body, it is possible to avoid having external cables which are swung along with the arms, thereby minimizing breakdown of the cables and providing a more reliable industrial robot. The modular upper arm, forearm, shoulder, elbow, and wrist units make it easy to provide horizontal arms of different lengths. Also, it is easy to mount the hand device in different directions.

What is claimed is:

1. An industrial robot comprising:
   a body;
   a trunk movably supported by said body;
   trunk actuator means provided within said body for moving said trunk in a linear vertical direction with respect to said body;
   a substantially L-shaped shoulder unit with a first cylindrical shoulder shaft rotatably supported by said trunk;
   shoulder actuator means provided within said body for rotating said shoulder unit;
   an elbow unit consisting of an upper elbow section and a lower elbow section with a cylindrical elbow shaft rotatably supported by said upper elbow section;
   a straight upper arm unit for connecting said elbow unit to said shoulder unit;
   a substantially L-shaped wrist unit with a wrist shaft;
   a straight forearm unit for connecting said wrist unit to said elbow unit;
   a hand device attached to said wrist shaft; substantially L-shaped cylindrical shoulder gear means rotatably supported within said shoulder unit;
   horizontal cylindrical elbow gear means provided within said upper elbow section for engagement with said cylindrical elbow shaft;
   straight cylindrical upper arm joint means rotatably supported within said upper arm unit for connecting said cylindrical shoulder gear means to said horizontal cylindrical elbow gear means;
   elbow actuator means provided within said body for swinging said forearm unit via said cylindrical shoulder gear means, cylindrical upper arm joint means, and horizontal cylindrical elbow gear means;
   substantially L-shaped shoulder gear means rotatably supported within said cylindrical shoulder gear means;
   elbow gear means rotatably supported within said cylindrical horizontal elbow gear means;
   straight upper arm joint means rotatably supported within said cylindrical upper arm joint means for connecting said shoulder gear means to said elbow gear means;
   substantially L-shaped wrist gear means rotatably supported within said wrist unit;
   straight forearm joint means rotatably supported within said forearm unit for connecting said elbow gear means to said wrist gear means; and
   wrist actuator means provided within said body for rotating said hand device with respect to said wrist unit via said shoulder gear means, upper arm joint means, elbow gear means, forearm joint means, and wrist gear means.

2. The industrial robot of claim 1, wherein each of said upper arm unit, said forearm unit and said elbow unit has a pair of flanges at either end thereof and each of said shoulder unit and said wrist unit has a flange at least one end thereof to be joined to a mating flange.

3. The industrial robot of claim 2, wherein each said flange is fastened to a mating flange with bolts, whereby any of said arm units may be replaced with an arm unit of a different length and said elbow and wrist units may be mounted to orient said hand device in a different direction.

4. An industrial robot comprising;
a body;
a trunk movably supported by said body;
trunk actuator means provided within said body for moving said trunk in a linear vertical direction with respect to said body;
a substantially L-shaped shoulder unit with a first cylindrical shoulder shaft rotatably supported by said trunk, said first cylindrical shoulder shaft having a toothed wheel at a free end;
shoulder actuator means provided within said body for rotating said shoulder unit, said shoulder actuator means including a spline shaft and a driving gear wheel which engages said toothed wheel and slides along said spline shaft to rotate said shoulder unit;
an elbow unit consisting of an upper elbow section and a lower elbow section with a cylindrical elbow shaft rotatably supported by said upper elbow section;
a straight upper arm unit for connecting said elbow unit to said shoulder unit;
a substantially L-shaped wrist unit with a wrist shaft;
a straight forearm unit for connecting said wrist unit to said elbow unit;
a hand device attached to said wrist shaft;
substantially L-shaped cylindrical shoulder gear means rotatably supported within said shoulder unit;
horizontal cylindrical elbow gear means provided within said upper elbow section for engagement with said cylindrical elbow shaft;
straight cylindrical upper arm joint means rotatably supported within said upper arm unit for connecting said cylindrical shoulder gear means to said horizontal cylindrical elbow gear means;
elbow actuator means provided within said body for swinging said forearm unit via said cylindrical shoulder gear means, cylindrical upper arm joint means, and horizontal cylindrical elbow gear means;
substantially L-shaped shoulder gear means rotatably supported within said cylindrical shoulder gear means;
elbow gear means rotatably supported within said horizontal cylindrical elbow gear means;
straight upper arm joint means rotatably supported within said cylindrical upper arm joint means for connecting said shoulder gear means to said elbow gear means;
substantially L-shaped wrist gear means rotatably supported within said wrist unit;
straight forearm joint means rotatably supported within said forearm unit for connecting said elbow gear means to said wrist gear means; and
wrist actuator means provided within said body for rotating said hand device with respect to said wrist unit via said shoulder gear means, upper arm joint means, elbow gear means, forearm joint means, and wrist gear means.

5. An industrial robot comprising:
a body;
a trunk movably supported by said body;
trunk actuator means provided within said body for moving said trunk in a linear vertical direction with respect to said body;
a substantially L-shaped shoulder unit with a first cylindrical shoulder shaft rotatably supported by said trunk;
shoulder actuator means provided within said body for rotating said shoulder unit;
an elbow unit consisting of an upper elbow section and a lower elbow section with a cylindrical elbow shaft rotatably supported by said upper elbow section;
a straight upper arm unit for connecting said elbow unit to said shoulder unit;
a substantially L-shaped wrist unit with a wrist shaft;
a straight forearm unit for connecting said wrist unit to said elbow unit;
a hand device attached to said wrist shaft;
substantially L-shaped cylindrical shoulder gear means rotatably supported within said shoulder unit, said cylindrical shoulder gear means having a toothed wheel within said body and a horizontal spline shaft at the other end;
horizontal cylindrical elbow gear means provided within said upper elbow section for engagement with said cylindrical elbow shaft;
straight cylindrical upper arm joint mean rotatably supported within said upper arm unit for connecting said cylindrical shoulder gear means to said horizontal cylindrical elbow gear means;
elbow actuator means provided within said body for swinging said forearm unit via said cylindrical shoulder gear means, cylindrical upper arm joint means, and horizontal cylindrical elbow gear means, said elbow actuator means including a spline shaft and a driving gear wheel which engages said toothed wheel and slides along said spline shaft to rotate said lower elbow section with respect to said upper elbow section via said cylindrical upper arm joint means, so as to swing said forearm unit;
substantially L-shaped shoulder gear means rotatably supported within said cylindrical shoulder gear means;
elbow gear means rotatably supported within said horizontal cylindrical elbow gear means;
straight upper arm joint means rotatably supported within said cylindrical upper arm joint means for connecting said shoulder gear means to said elbow gear means;
substantially L-shaped wrist gear means rotatably supported within said wrist unit;
straight forearm joint means rotatably supported within said forearm unit for connecting said elbow gear means to said wrist gear means; and
wrist actuator means provided within said body for rotating said hand device with respect to said wrist unit via said shoulder gear means, upper arm joint means, elbow gear means, forearm joint means, and wrist gear means.

6. An industrial robot comprising:
a body;
a trunk movably supported by said body;

trunk actuator means provided within said body for moving said trunk in a linear vertical direction with respect to said body;

a substantially L-shaped shoulder unit with a first cylindrical shoulder shaft rotatably supported by said trunk;

shoulder actuator means provided within said body for rotating said shoulder unit;

an elbow unit consisting of an upper elbow section and a lower elbow section with a cylindrical elbow shaft rotatably supported by said upper elbow section;

a straight upper arm unit for connecting said elbow unit to said shoulder unit;

a substantially L-shaped wrist unit with a wrist shaft;

a straight forearm unit for connecting said wrist unit to said elbow unit;

a hand device attached to said wrist shaft;

substantially L-shaped cylindrical shoulder gear means rotatably supported within said shoulder unit;

horizontal cylindrical elbow gear means provided within said upper elbow section for engagement with said cylindrical elbow shaft;

straight cylindrical upper arm joint means rotatably supported within said upper arm unit for connecting said cylindrical shoulder gear means to said horizontal cylindrical elbow gear means;

elbow actuator means provided within said body for swinging said forearm unit via said cylindrical shoulder gear means, cylindrical upper arm joint means, and horizontal cylindrical elbow gear means;

substantially L-shaped shoulder gear means rotatably supported within said cylindrical shoulder gear means, said shoulder gear means having a toothed wheel within said body and a horizontal spline shaft at the other end;

elbow gear means rotatably supported within said horizontal cylindrical elbow gear means;

straight upper arm joint means rotatably supported within said cylindrical upper arm joint means for connecting said shoulder gear means to said elbow gear means;

substantially L-shaped wrist gear means rotatably supported within said wrist unit;

straight forearm joint means rotatably supported within said forearm unit for connecting said elbow gear means to said wrist gear means; and wrist actuator means provided within said body for rotating said hand device with respect to said wrist unit via said shoulder gear means, upper arm joint means, elbow gear means, forearm joint means, said wrist gear means, said wrist actuator means including a spline shaft and a driving gear wheel which engages said toothed wheel and slides along said spline shaft to rotate said wrist shaft via said upper arm joint means and said forearm joint means, thereby bringing said hand to a desired angle to a piecework.

7. The industrial robot of claim 1, wherein said substantially L-shaped cylindrical shoulder gear means comprises:

a second cylindrical shoulder shaft with a first bevel gear wheel within said shoulder unit; and a horizontal cylindrical shoulder shaft having a second bevel gear wheel for engagement with said first bevel gear wheel, and a spline shaft at a free end of said horizontal cylindrical shoulder shaft.

8. The industrial robot of claim 1, wherein said substantially L-shaped cylindrical shoulder gear means comprises:

a shoulder shaft with a first bevel gear wheel within said shoulder unit; and a horizontal shoulder shaft having a second bevel gear wheel for engagement with said first bevel gear wheel, and a spline shaft at a free end of said horizontal shoulder shaft.

9. The industrial robot of claim 1, wherein said elbow gear means comprises:

a lower elbow shaft rotatably supported within said cylindrical lower shaft and having an upper bevel gear and a lower bevel gear;

a horizontal shaft rotatably supported by said horizontal cylindrical upper elbow gear means and having a first bevel gear for engagement with said upper bevel gear and a spline shaft at a free end of said horizontal shaft; and a horizontal lower elbow shaft rotatably supported by said lower elbow section and having a second bevel gear for engagement with said lower bevel gear and a spline shaft at a free end of said horizontal lower elbow shaft.

10. The industrial robot of claim 1, wherein said substantially L-shaped wrist gear means comprises:

a wrist shaft with a first bevel gear at an upper end opposite to a lower end to which said hand device is attached; and a horizontal shaft with a second bevel gear for engagement with said first bevel gear and a spline shaft at a free end of said horizontal shaft.

11. In an industrial robot of the type having a body, a first joint connected to said body for linear vertical movement relative to said body, actuator means to move said first joint vertically, a first arm portion attached to said first joint for horizontal rotational movement therewith, a second joint attached to said first arm portion and having a part rotatable horizontally relative to said first arm portion, and a second arm portion attached to said rotatable part of said second joint for horizontal rotation therewith; the improvement comprising:

a first joint actuator located within said body;

first joint gear train means located within said body and being connected between said first joint actuator and said first joint for transmitting the energy of said first joint actuator to said first joint to rotate horizontally said first joint and said first arm portion;

a second joint actuator located within said body; and second joint gear train means located within said body, said first joint, said first arm portion, and said second joint for transmitting the energy of said second joint actuator to said rotatable part of said second joint to rotate horizontally said second joint and said second arm portion.

12. The invention of claim 11, wherein said first joint gear means is hollow and said second joint gear means extends through the hollow portion of said first joint gear means.

13. The invention of claim 12, wherein said first and second joints and said first and second arm portions have respective flanges on the ends thereof which connect to respective other ones of said first and second joints and said first and second arm portions, said flanges on connecting parts being mating flanges which may be bolted together.

14. The invention of claim 12, wherein said robot is further of the type having a third joint connected to the other end of said second arm and a rotatable part rotatably connected to said third joint; the improvement further comprising:

a third joint actuator means located within said body, and third joint gear train means connected within said body, said first joint, said first arm, said second joint, said second arm, and said third joint for transmitting the energy of said third joint actuator means to said last mentioned rotatable part to rotate said rotatable part.

15. The invention of claim 14, wherein said second joint gear train means is hollow and said third joint gear train means extends through the hollow portion of said second joint gear train means.

* * * * *